April 9, 1935.   P. T. CHAMPLIN   1,997,131

KNIFE

Filed July 5, 1933

Inventor

P. T. Champlin.

By Lacey & Lacey, Attorneys

Patented Apr. 9, 1935

1,997,131

UNITED STATES PATENT OFFICE 1,997,131

KNIFE

Philip T. Champlin, Little Valley, N. Y.

Application July 5, 1933, Serial No. 679,100

1 Claim. (Cl. 30—9)

This invention relates to knives and has for its object the provision of a construction whereby a given handle may be fitted to a variety of blades and the blade to which it is fitted firmly secured. Another object of the invention is to provide a knife construction whereby the handle may be very easily and rapidly removed from a broken blade and a new blade fitted therein without the use of special tools. The stated objects, and other objects which will incidentally appear in the course of the following description, are attained in such a device as is illustrated in the accompanying drawing, and the invention resides in certain novel features which will be particularly defined in the appended claim.

Figure 1:
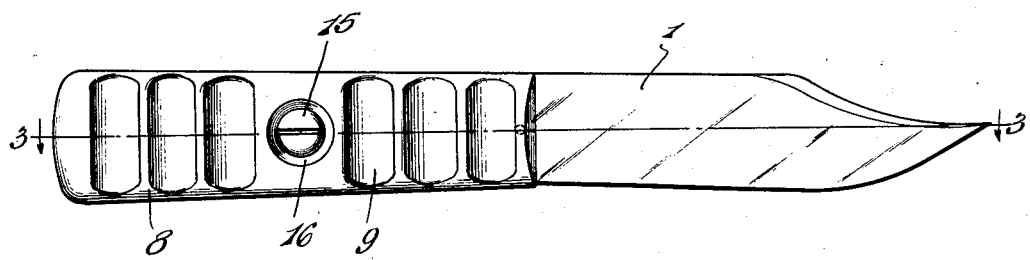
Figure 2:
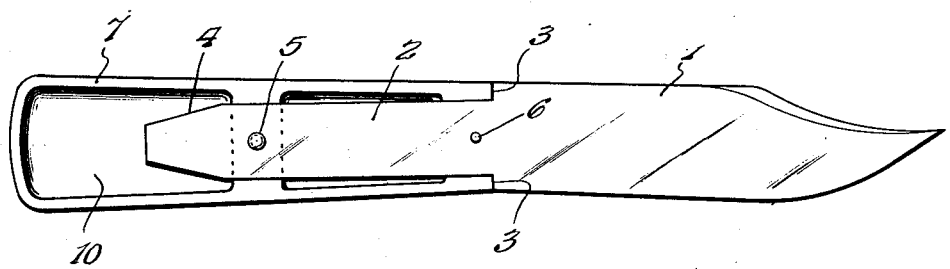
Figure 3:
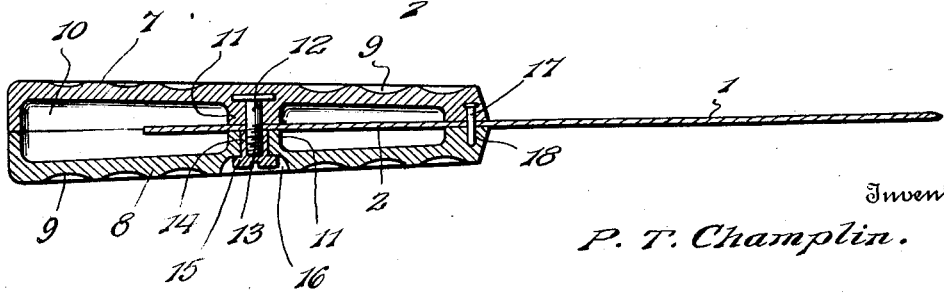

In the drawing, Fig. 1 is a side elevation of a knife embodying the present invention, Fig. 2 is a similar view with one side of the handle removed, Fig. 3 is a longitudinal section on the line 3—3 of Fig. 1.

In carrying out the present invention, there is provided a blade 1, which may be given any preferred outline, having a tang 2 with shoulders 3 at the opposite sides of the tang and at right angles thereto. The end of the tang is preferably tapered, as shown at 4, to facilitate its insertion in the handle and also to reduce weight. Near its tapered end, the tang is provided with an opening 5 therethrough and adjacent the shoulders 3 a smaller opening 6 is formed through the tang.

The handle comprises two mating members 7 and 8 which are provided with transverse grooves or recesses 9 in their outer surfaces so that the fingers of the user may comfortably and firmly grip the handle. The handle members are preferably hollow, as shown at 10, so as to reduce the weight and also to provide spaces at opposite sides of the end of the tang so that the tang may be easily grasped when the blade is to be removed. Between their ends, the handle members are provided with internal projections or bosses 11 which abut the tang of the blade when the parts are assembled, as shown in Fig. 3 and in the handle member 7 a stud 12 is embedded in the boss and projects therefrom, the extremity of the stud being threaded, as shown at 13. The boss 11 on the handle member 8 has an opening formed therethrough of somewhat greater diameter than the threaded stud 13 and this opening receives the internally threaded sleeve or hub 14 of a bolt 15, the head of the bolt being accommodated in a recess 16 provided therefor in the handle member, as shown in Figs. 1 and 3. At the end of the handle member 7, a pin or stud 17 is embedded and projects therefrom to engage a socket 18 provided therefor in the handle member 8, as clearly shown in Fig. 3, the pin or stud passing through the opening 6 in the tang of the blade, as shown.

In assembling the parts, the tang of the blade is fitted against the bosses of the handle member 7 with the studs 12 and 17 passing through the openings provided therefor in the tang, as will be understood, and the bosses may be formed with shallow recess or seats to receive the tang and engage the edges thereof so that the tang will be very firmly held. The handle member 8 is then fitted over the ends of the studs 12 and 17 and against the side of the tang, after which the bolt 15 is engaged with the threaded end of the stud 12 and turned home, thereby clamping the tang of the blade very securely between the two handle members.

It will be readily seen that the construction shown and described provides a handle which may be applied to various blades so that a single handle may be made to accommodate various blades at will and thereby accommodate various blades at will and thereby accommodate the knife to the particular work to be done. The parts may be very quickly assembled and disassembled, whenever necessary, and when assembled the blade will be very firmly secured and held against twisting in the handle, it being noted that the shoulders 3 at the end of the tang or the junction of the same with the main body of the blade abut the ends of the handle and the pins or studs in the handle cooperate with these shoulders so as to very firmly secure the blade. The construction is simple and inexpensive and a single fastening secures all the parts together.

Having thus described the invention, I claim:

A knife comprising hollow handle members having their exterior faces provided with transversely disposed depressions forming finger grips and provided with spaced pairs of interior reinforcing bosses, one pair of said bosses being spaced from the outer end of the handle to form a chamber and the inner face of one of the bosses of each pair being provided with a seat, a knife blade having a reduced tang fitted in the seats and defining oppositely disposed shoulders bearing against the front of the handle, said tang being provided with spaced openings disposed at said pairs of bosses and having its free end extended longitudinally within the chamber in lateral spaced relation to the walls thereof, a centering pin carried by a boss of one pair and extending through the adjacent opening in the tang and fitting in a socket of the mating boss of said pair, a threaded stud seated in one of the bosses of another pair and extending through the adjacent opening in the tang, and a cap screw carried by the other boss of said pair and engaging the threaded end of the stud with the head of the cap countersunk in the outer surface of the adjacent handle member whereby to clamp the tang firmly between said handle members.

PHILIP T. CHAMPLIN. [L. S.]